(12) United States Patent
Handel et al.

(10) Patent No.: US 10,837,158 B2
(45) Date of Patent: Nov. 17, 2020

(54) LOADER, OPERATOR SEAT ASSEMBLY WITH INTEGRATED, NON-ELECTRONIC HYDRAULIC PILOT VALVES

(71) Applicant: Manitou Equipment America, LLC, West Bend, WI (US)

(72) Inventors: Tyler James Handel, Menomonee Falls, WI (US); Alexander Roman Prokopowicz, Slinger, WI (US)

(73) Assignee: Manitou Equipment America, LLC, West Bend, WI (US)

( * ) Notice: Subject to any disclaimer, the term of this patent is extended or adjusted under 35 U.S.C. 154(b) by 261 days.

(21) Appl. No.: 15/891,257

(22) Filed: Feb. 7, 2018

(65) Prior Publication Data
US 2019/0242093 A1   Aug. 8, 2019

(51) Int. Cl.
*E02F 9/00* (2006.01)
*E02F 9/16* (2006.01)
*E02F 3/34* (2006.01)
*E02F 9/22* (2006.01)
*E02F 9/02* (2006.01)
*E02F 9/20* (2006.01)
*B60R 21/02* (2006.01)
(Continued)

(52) U.S. Cl.
CPC .............. *E02F 9/166* (2013.01); *B60N 2/02* (2013.01); *B60N 2/75* (2018.02); *B60R 21/02* (2013.01); *E02F 3/3414* (2013.01); *E02F 9/02* (2013.01); *E02F 9/2004* (2013.01); *E02F 9/2267* (2013.01); *E02F 9/2271* (2013.01); *E02F 9/2275* (2013.01); *E02F 9/2285* (2013.01); *E02F 9/2292* (2013.01); *E02F 9/2296* (2013.01); *F15B 13/0422* (2013.01); *B60R 2021/022* (2013.01)

(58) Field of Classification Search
CPC ..... E02F 9/2264; E02F 9/2004; E02F 9/2285; E02F 9/2275; E02F 9/166; E02F 9/16; E02F 3/3414; F15B 13/0422; B60N 2/75; B60N 2/763; B60N 2/773; B60N 2/02
See application file for complete search history.

(56) References Cited

U.S. PATENT DOCUMENTS 5,639,993 A * 6/1997 Ideno .................. B60R 16/0222
174/153 G
5,666,861 A * 9/1997 Fee ........................ B60N 2/777
74/523
(Continued)

FOREIGN PATENT DOCUMENTS

EP           1849651 A2 * 10/2007  ............. B60N 2/502

*Primary Examiner* — Steve Clemmons
(74) *Attorney, Agent, or Firm* — Reinhart Boerner Van Deuren s.c.

(57) ABSTRACT

A loader having a seat assembly mounted in the loader cab for movement along 2 axes. The cab pivots relative to the loader to permit access to loader components. The main operator controls in the loader are pilot valves operated by the loader operator without any electronic interfacing between the operator and the pilot valves. The pilot valves are supported directly by the seat assembly to move with the seat assembly and reduce inadvertent pilot valve motion induced by vehicle movement. Also provided is a hydraulic hose channeling arrangement which permits the support of hydraulic pilot valves relative to a seat assembly which is moveably mounted in a pilotable loader cab.

18 Claims, 14 Drawing Sheets

(51) Int. Cl.
*F15B 13/042* (2006.01)
*B60N 2/75* (2018.01)
*B60N 2/02* (2006.01)

(56) References Cited

U.S. PATENT DOCUMENTS

| | | | | |
|---|---|---|---|---|
| 6,202,501 | B1* | 3/2001 | Ikari | B62D 1/12 |
| | | | | 180/332 |
| 7,506,918 | B2* | 3/2009 | Magni | B60N 2/06 |
| | | | | 296/190.08 |
| 7,757,806 | B2* | 7/2010 | Bower | B60N 2/06 |
| | | | | 180/326 |
| 7,975,793 | B1* | 7/2011 | Claas | B60N 2/24 |
| | | | | 180/89.13 |
| 8,226,155 | B2* | 7/2012 | Hill | B60R 21/02 |
| | | | | 296/190.01 |
| 8,342,789 | B2* | 1/2013 | Yasuda | E02F 3/3405 |
| | | | | 180/328 |
| 8,464,828 | B2* | 6/2013 | Takeda | E02F 9/2275 |
| | | | | 150/154 |
| 9,169,621 | B2* | 10/2015 | Masuda | E02F 9/16 |
| 9,651,181 | B2* | 5/2017 | Luce | F16L 35/00 |
| 10,407,871 | B2* | 9/2019 | Nishigori | E02F 9/2004 |
| 2006/0000656 | A1* | 1/2006 | Bisick | B60N 2/797 |
| | | | | 180/272 |
| 2009/0243338 | A1* | 10/2009 | Ueda | E02F 9/163 |
| | | | | 296/190.01 |
| 2010/0026026 | A1* | 2/2010 | Akahane | B60N 2/77 |
| | | | | 296/24.34 |
| 2012/0304447 | A1* | 12/2012 | Smith | F16L 57/02 |
| | | | | 29/434 |
| 2013/0061424 | A1* | 3/2013 | Lee | B60R 16/0222 |
| | | | | 16/2.2 |
| 2018/0266080 | A1* | 9/2018 | Fukuda | E02F 9/2267 |

\* cited by examiner

LOADER, OPERATOR SEAT ASSEMBLY WITH INTEGRATED, NON-ELECTRONIC HYDRAULIC PILOT VALVES

BACKGROUND OF THE INVENTION

The present invention relates to the operator seat for a loader such as a skid-steer loader or a tracked loader. In particular, the primary operator controls for such a loader in the present invention are a pair of two (2) axis pilot valves which are supported by an operator seat assembly configured to move along at least two (2) axes.

SUMMARY OF THE INVENTION

One embodiment provides a loader including a chassis, a loader assembly supported by the chassis and motivated by at least first and second hydraulic cylinders, a hydraulic pump coupled to the first and second hydraulic cylinders by respective first and second hydraulic valves, at least two wheels driven by respective first and second hydraulic motors for moving the chassis, and a cab pivotally coupled to the chassis and including a floor and a plurality of cab walls extending from the floor. The loader also includes a seat having a back rest, first and second arm rests, and a base attached to the floor to resiliently move perpendicular to the floor, and be selectively moveable parallel to the floor, first and second variable displacement pumps coupled respectively to the first and second hydraulic motors, a first operator-actuated hydraulic pilot valve coupled to the first and second hydraulic valves to control the flow of hydraulic fluid to the hydraulic cylinders, the first operator-actuated hydraulic pilot valve being attached to the seat proximate to one of the arm rests, and a second operator-actuated hydraulic pilot valve coupled to the first and second pumps to control the first and second hydraulic motors, the second operator-actuated hydraulic pilot valve being attached to the seat proximate to one of the other of the arm rests. One set of hydraulic hoses extends through one of the cab walls and attaches the first operator-actuated hydraulic pilot valve to the first and second hydraulic valves. Another set of hydraulic hoses extends through one of the cab walls and attaches the second operator-actuated hydraulic pilot valve to the first and second hydraulic motors. When the seat moves relative to the cab, the operator-actuated hydraulic pilot valves move with the seat relative to the cab.

Another embodiment provides a hydraulic control system for use by the operator of a loader. The system includes a hydraulic pump coupled to the first and second hydraulic cylinders by respective first and second hydraulic valves, first and second hydraulic motors for rotating respective wheels, a seat including a back rest, first and second arm rests, and a base attached to a floor of an operator cab to resiliently move perpendicular to the floor, and be selectively moveable parallel to the floor, and first and second variable displacement pumps coupled respectively to the first and second hydraulic motors. The system also includes a first operator-actuated hydraulic pilot valve coupled to the first and second hydraulic valves to control the flow of hydraulic fluid to the hydraulic cylinders, the first operator-actuated hydraulic pilot valve being attached to the seat proximate to one of the arm rests, and second operator-actuated hydraulic pilot valve coupled to the first and second pumps to control the first and second hydraulic motors, the second operator-actuated hydraulic pilot valve being attached to the seat proximate to one of the other of the arm rests. A first set of hydraulic hoses attaches the first operator-actuated hydraulic pilot valve to the first and second hydraulic valves; and a second plurality of hydraulic hoses attaches the second operator-actuated hydraulic pilot valve to the first and second hydraulic motors. When the seat moves relative to the cab, the operator-actuated hydraulic pilot valves move with the seat relative to the cab One embodiment provides a loader including a chassis, a loader assembly supported by the chassis and motivated by at least first and second hydraulic cylinders, a hydraulic pump coupled to the first and second hydraulic cylinders by respective first and second hydraulic valves, at least two wheels driven by respective first and second hydraulic motors for moving the chassis, and a cab pivotally coupled to the chassis and including a floor and a plurality of cab walls extending from the floor. The loader also includes a seat having a back rest, first and second arm rests, and a base attached to the floor to resiliently move perpendicular to the floor, and be selectively moveable parallel to the floor, first and second variable displacement pumps coupled respectively to the first and second hydraulic motors, a first operator-actuated hydraulic pilot valve coupled to the first and second hydraulic valves to control the flow of hydraulic fluid to the hydraulic cylinders, the first operator-actuated hydraulic pilot valve being attached to the seat proximate to one of the arm rests, and a second operator-actuated hydraulic pilot valve coupled to the first and second pumps to control the first and second hydraulic motors, the second operator-actuated hydraulic pilot valve being attached to the seat proximate to one of the other of the arm rests. One set of hydraulic hoses extends through one of the cab walls and attaches the first operator-actuated hydraulic pilot valve to the first and second hydraulic valves. Another set of hydraulic hoses extends through one of the cab walls and attaches the second operator-actuated hydraulic pilot valve to the first and second hydraulic motors. When the seat moves relative to the cab, the operator-actuated hydraulic pilot valves move with the seat relative to the cab.

Another embodiment of the loader includes a chassis, a task handling means supported by the chassis and motivated by at least first and second hydraulic cylinders, a hydraulic pump coupled to the first and second hydraulic cylinders by respective first and second hydraulic valves, at least two wheels driven by respective first and second hydraulic motors for moving the chassis, a cab pivotally coupled to the chassis and including a floor and a plurality of cab walls extending from the floor, a seat including a back rest, first and second arm rests, and a base attached to the floor to resiliently move perpendicular to the floor, and be selectively moveable parallel to the floor, and first and second variable displacement pumps coupled respectively to the first and second hydraulic motors. Also included are a first operator-actuated means for controlling the flow of hydraulic fluid to the hydraulic cylinders, the operator-actuated means being attached to the seat proximate to one of the arm rests, and a second operator-actuated means for controlling the first and second variable displacement pumps, the second operator-actuated means being attached to the seat proximate to one of the other of the arm rests. One set of hydraulic hoses extend through one of the cab walls and attach the first operator-actuated means to the first and second hydraulic valves. Another set of hydraulic hoses extending through one of the cab walls and attach the second operator-actuated means to the first and second hydraulic motors. When the seat moves relative to the cab, the first and second operator-actuated means move with the seat relative to the cab.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting. When referring to the right and left sides of the loader, both references are made from the front of the loader.

Figure 1:
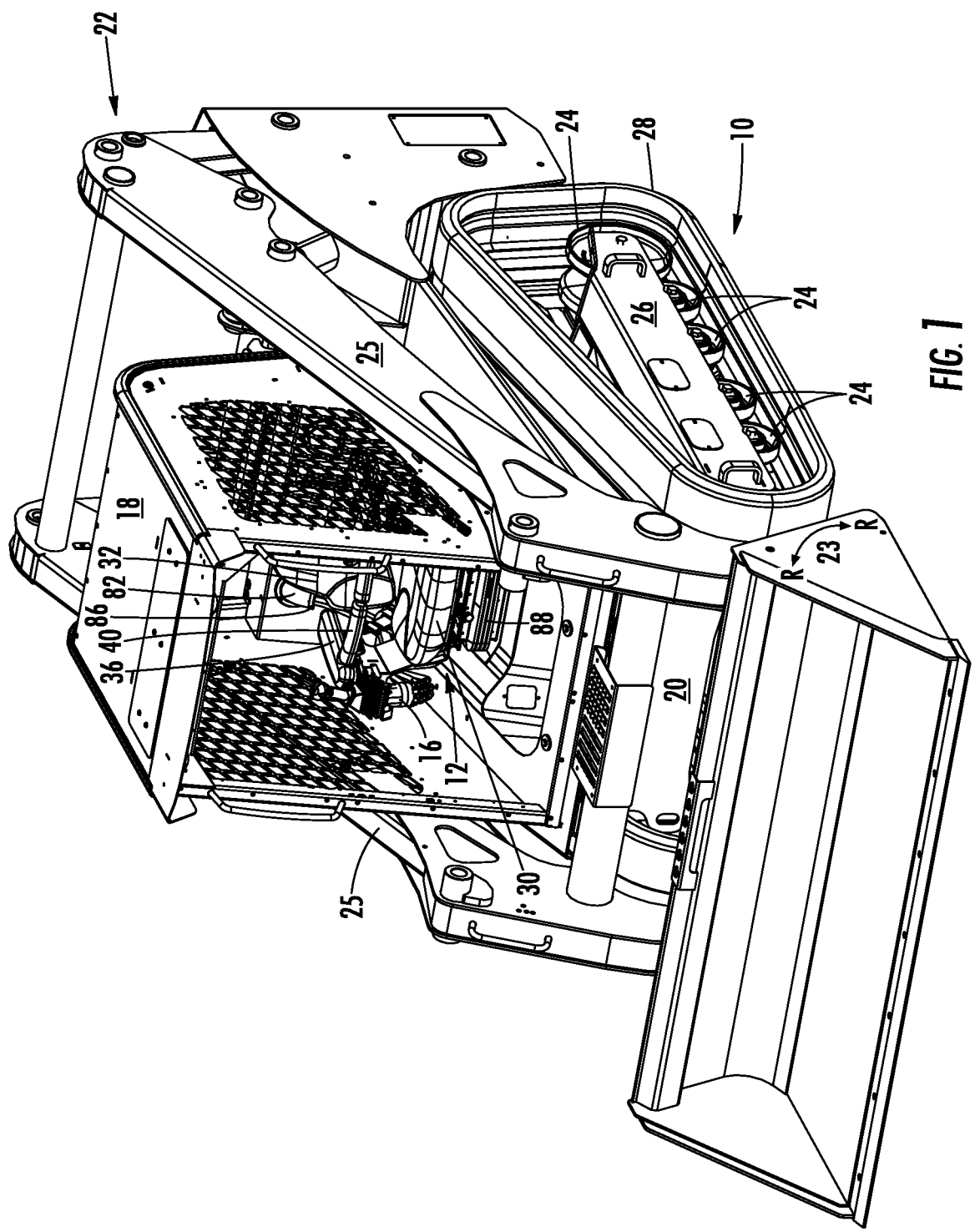
FIG. 1 is a perspective view of a loader incorporating the present invention.

FIG. 1 illustrates one embodiment or type of loader 10 (e.g. tracked loader) which incorporates the present invention which relates to an integrated seat assembly 12 which directly supports hydraulic control valves such as hydraulic pilot valves 14 and 16 so that these valves move with seat assembly 12 when its position is adjusted relative to cab 18. Loader 10 includes all of the components required for a tracked-type loader including, for example, a chassis 20, a lift assembly 22 supported by chassis 20 (which may or may not include a bucket 23, or other implement (e.g. cold planer, sweeper, hammer, tiller, power rake, snow-blower, etc.)) and motivated by hydraulic cylinders (not shown). Other such components include right and left side driven wheels (not shown) which cooperate with the idler wheels 24 of an associated track carriage 26 to movably support tracks 28. As an alternative to the tracked configuration, loader 10 may also be of the wheeled-type where the tracks are each replaced with 2 similar sized wheels on each side of loader 10 driven in synchronism. The present invention does not use or interpose electronic controls or actuators between the operator and the valves or pumps controlled by hydraulic pilot valves 14, 16. This greatly simplifies the control system for maintenance and repair, and provides many operators with a "feel" which is more desirable than systems with use electronic controls and actuators.

Figure 2:
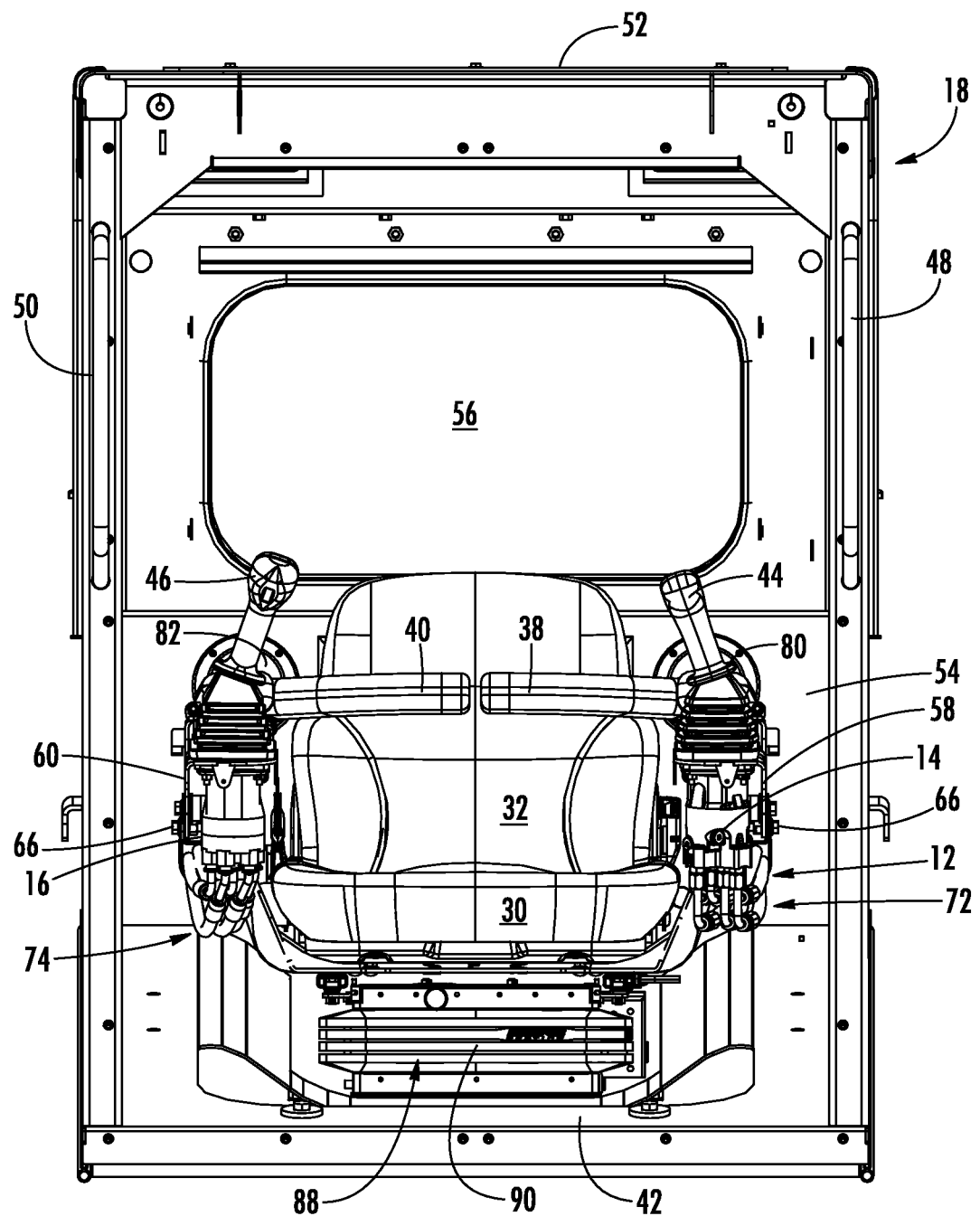
FIG. 2 is a front view of the loader operator cab.
Figure 3:
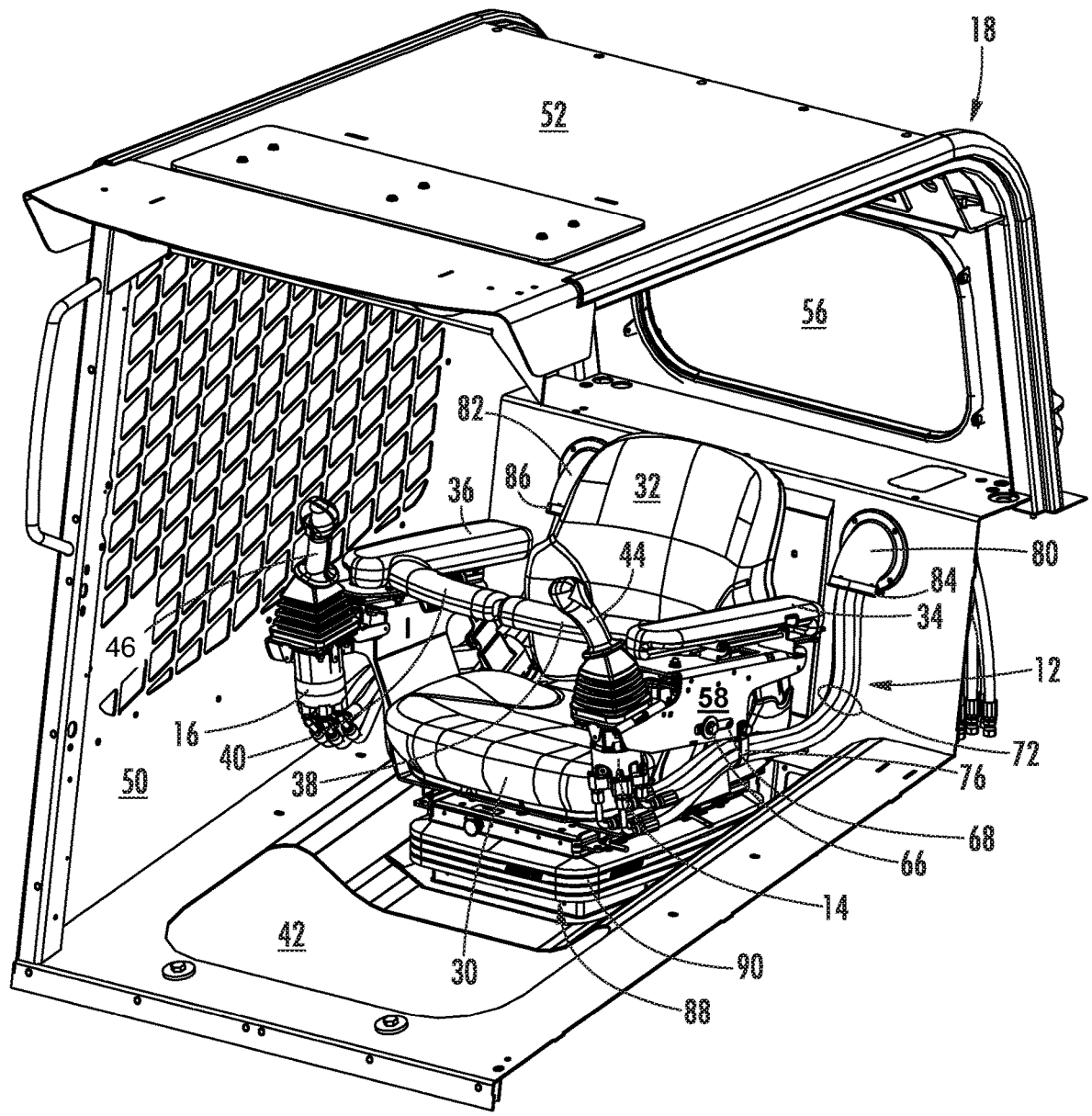
FIG. 3 is a partial right-side perspective view of the cab with the right cab side wall removed.
Figure 4:
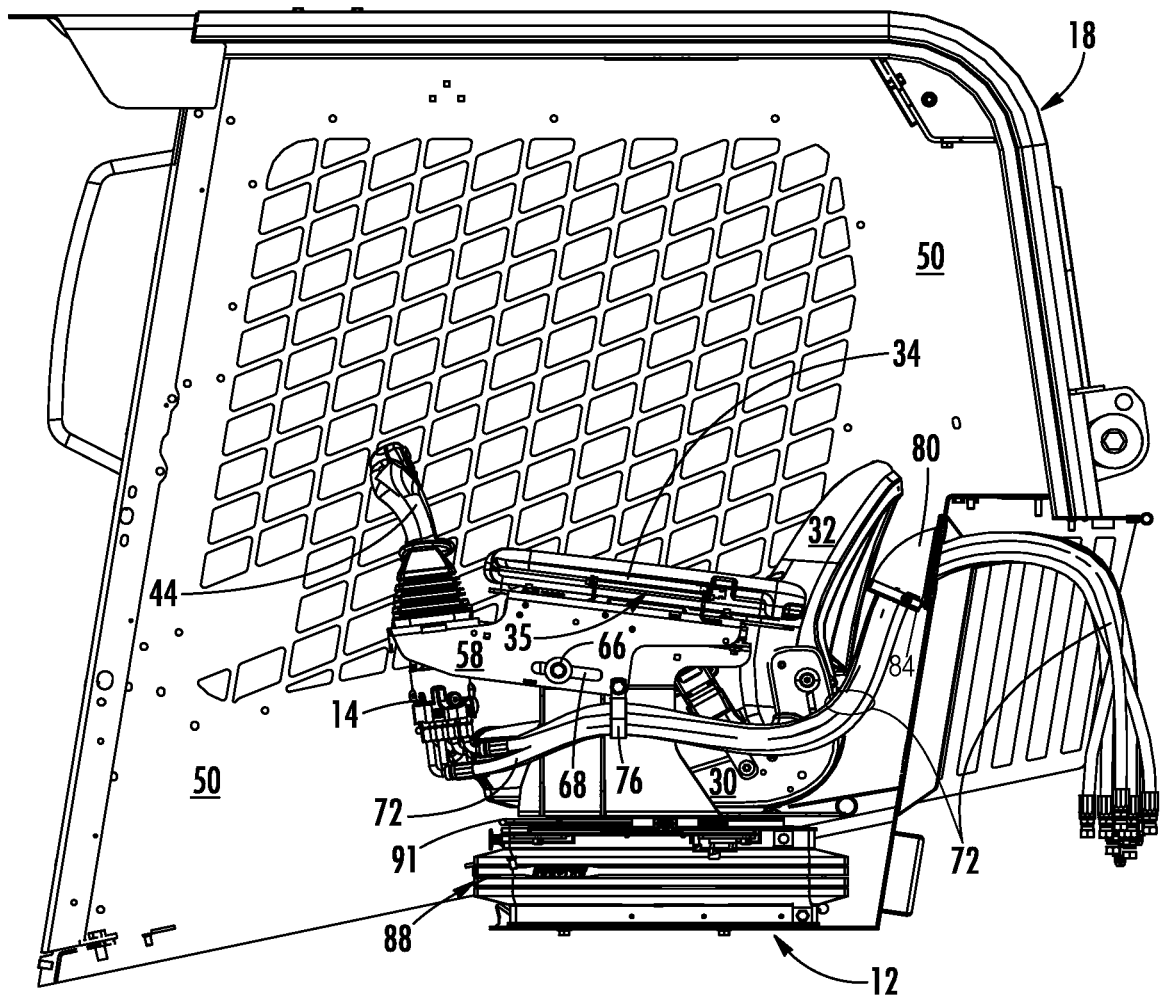
FIG. 4 is a partial side view of the cab with the right cab side wall removed.
Figure 5:
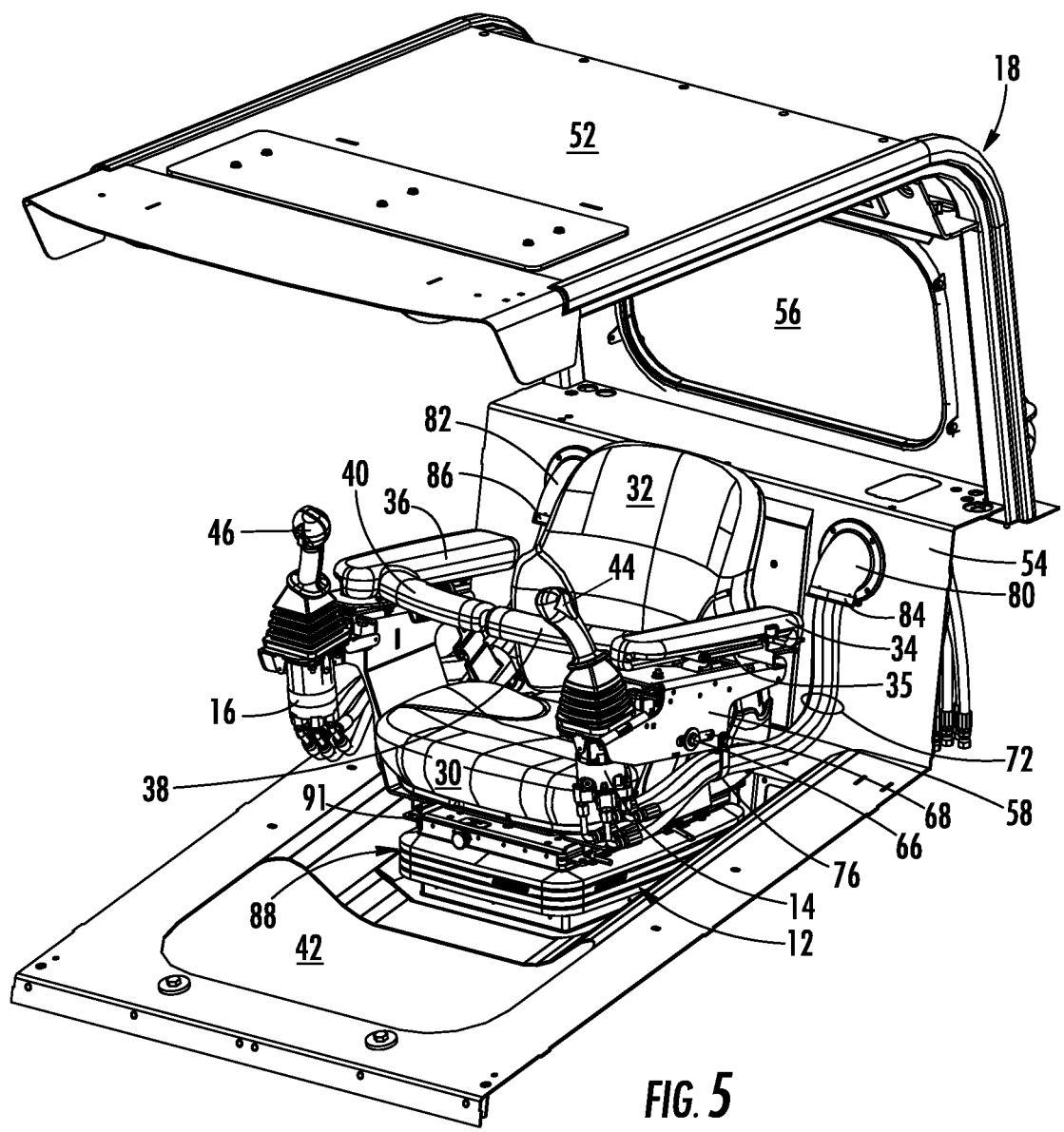
FIG. 5 is a partial right-side perspective view of the cab with the right and left cab side walls removed showing the operator restraints in a restrain position.
Figure 6:
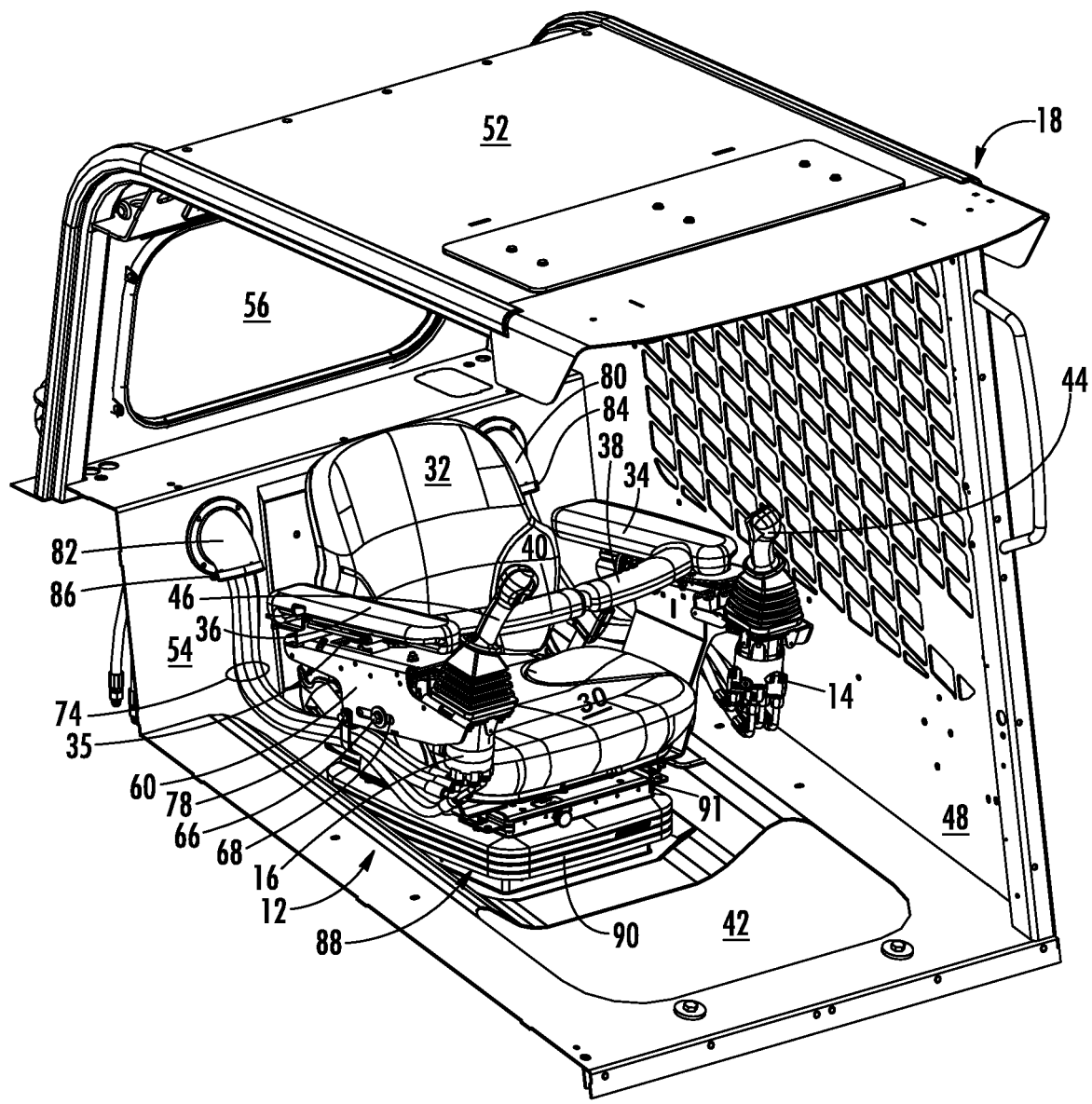
FIG. 6 is a partial left-side perspective view of the cab with the left cab side wall removed.

Referring to FIG. 2, the seat assembly 12 includes a seat 30, a back rest/seat back 32, first and second arm rests 34, 36 (see FIG. 3) and operator restraints 38, 40 arranged as shown. Control valves 14 and 16 are shown supported by seat assembly 12 as opposed to being supported by cab floor 42. Each valve 14, 16 includes a respective control handle 44, 46. In addition to floor 42, cab 18 includes a right side wall 48, left side wall 50, a top wall (roof) 52, a rear wall 54 (having a rear window 56) and a front door (not shown). The seat assembly 12 is an integrated, self-contained operator seat and control center wherein all of the important operator controls are included as part of seat assembly 12.

Referring to FIGS. 3-12, control valve 14, arm rest 34, and operator restraint 38 are supported by a right, slidable/adjustable frame 58, and control valve 16, arm rest 36, and operator restraint 40 are supported by a left, slidable/adjustable frame 60. Each frame 58, 60 is slidably attached to seat assembly 12 to permit movement of the respective valves 14, 16 and control handles 44, 46 relative to seat back 32 thereby ergonomically, accommodating different sized operators. Additionally, on rough terrain, by having the valves 14, 16 stationary relative to the seat assembly, inadvertent motion of the valves 14, 16 due to jarring of loader 10 is avoided or greatly reduced.

Figure 7:
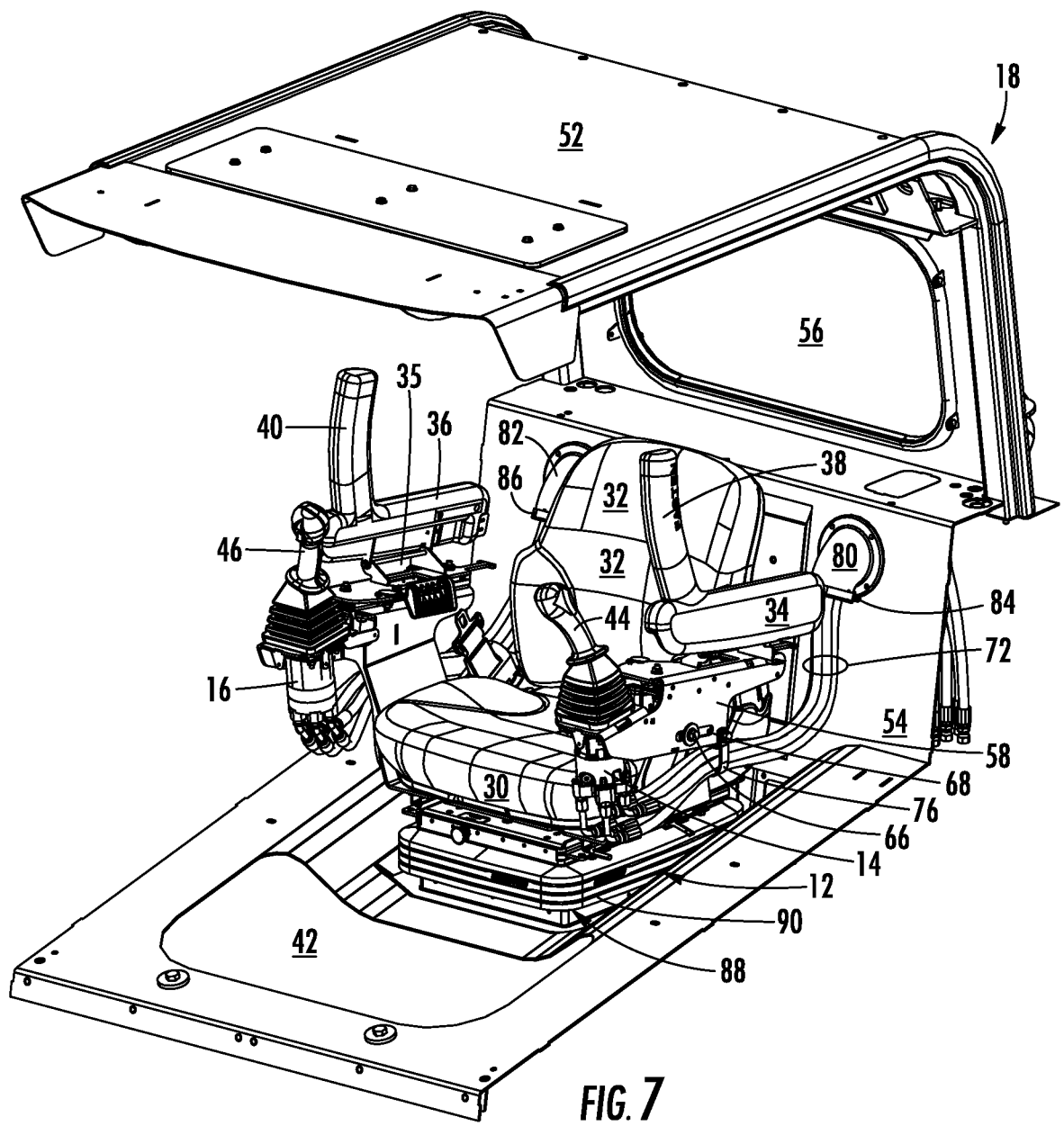
FIG. 7 is a partial right-side perspective view of the cab with the right and left cab side walls removed showing the operator restraints in a non-restraint position.
Figure 8:
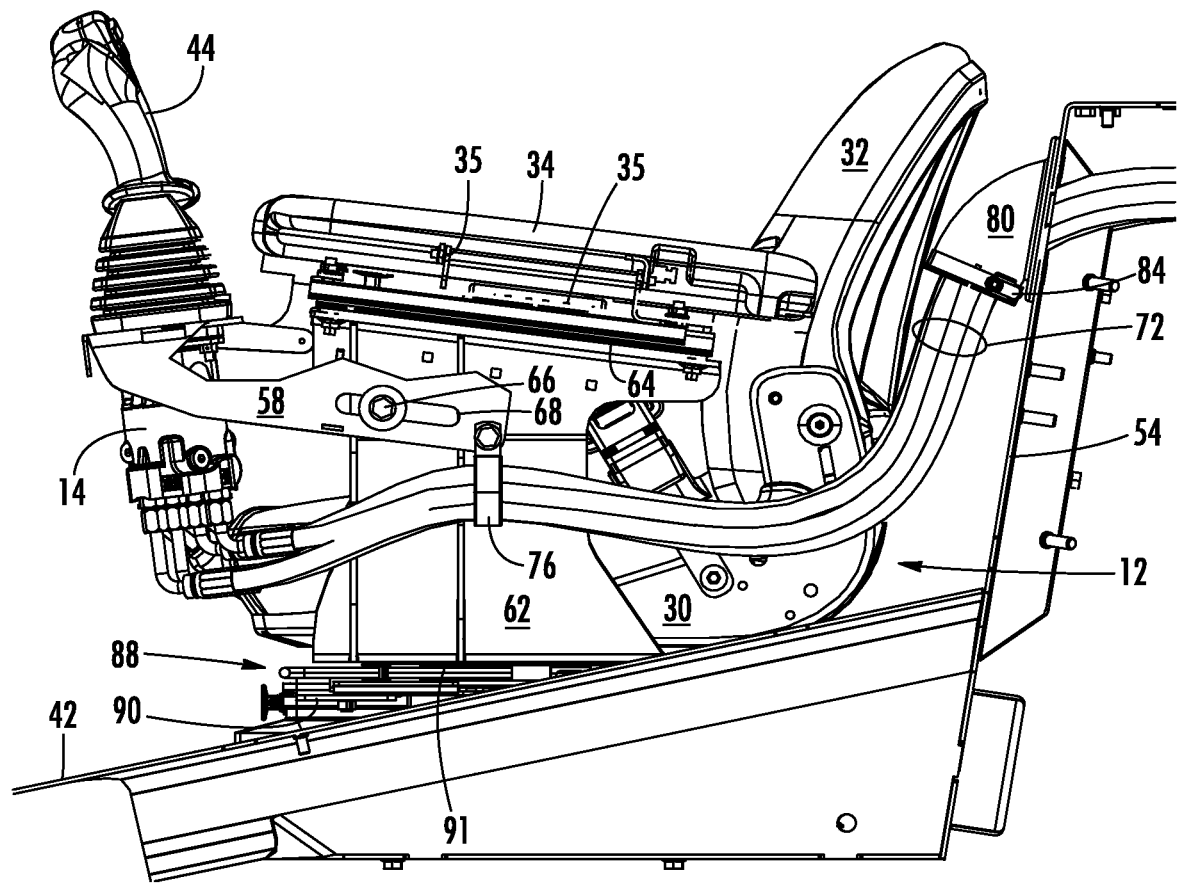
FIG. 8 is a partial right-side view of the cab illustrating the control valve and arm rest in a center position relative to the seat back, illustrating the seat assembly in a center position relative to the rear wall of the cab, illustrating the seat assembly in a center-raised position, and includes a partial cutaway view of the frame so as to depict a slide for the frame, and also illustrating the manner in which the hydraulic hoses from the right control valve pass through the rear wall of the cab.
Figure 9:
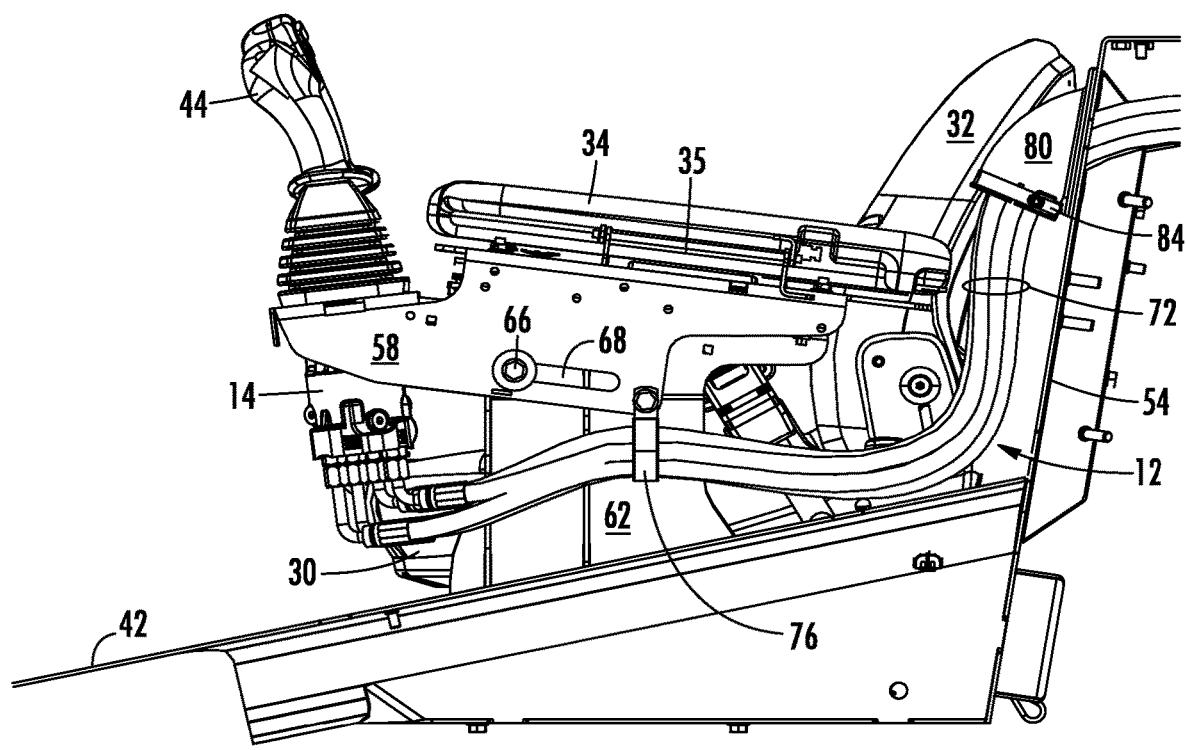
FIG. 9 is generally the same as FIG. 8 with the exception that the control valve and arm rest are located at the rear-most position relative to the seat back, the seat assembly is positioned in its rear-most position relative to the rear wall of the cab, and the seat assembly is positioned in a low position relative to the cab floor.
Figure 10:
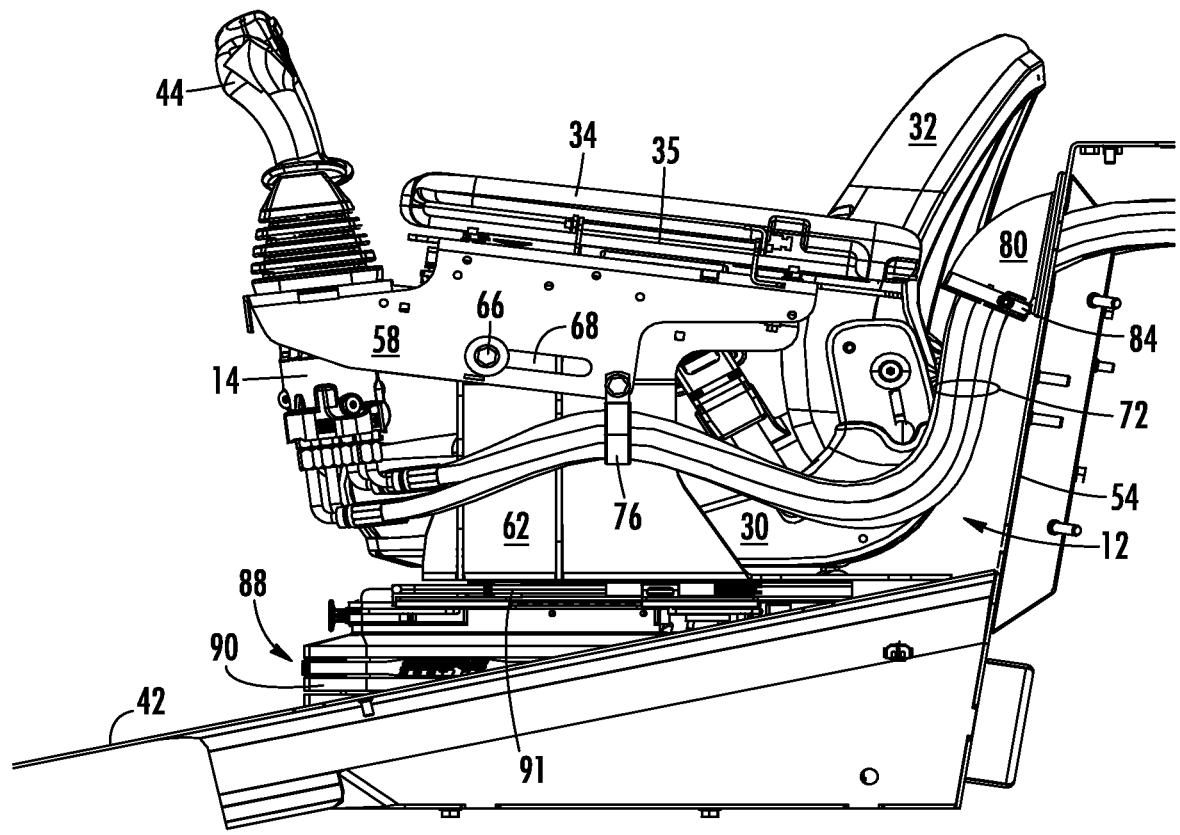
FIG. 10 is generally the same as FIG. 8 with the exception that the control valve and arm rest are located at the rear-most position relative to the seat back, the seat assembly is positioned in the rear-most position relative to the rear wall of the cab, and the seat assembly is positioned in a high position relative to the cabin floor.
Figure 11:
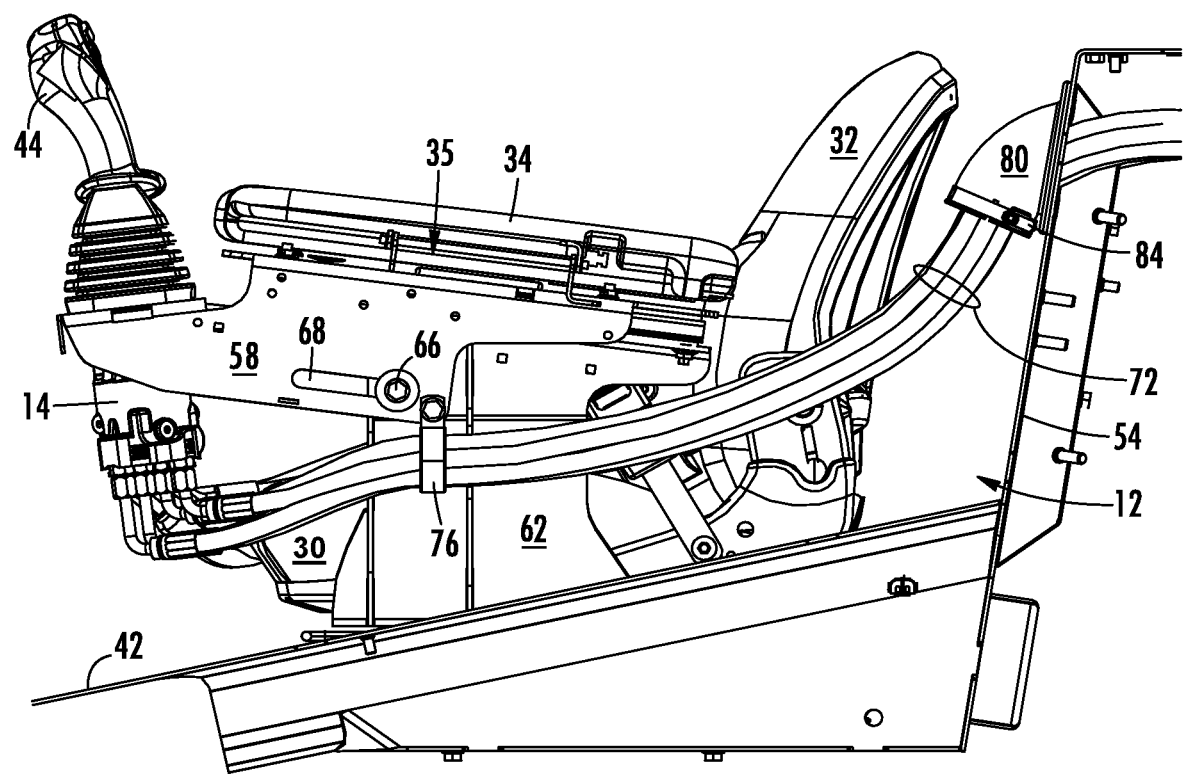
FIG. 11 is generally the same as FIG. 8 with the exception that the control valve and arm rest are located at the forward-most position relative to the seat back, the seat assembly is positioned in its lowest position relative to the cab floor.
Figure 12:
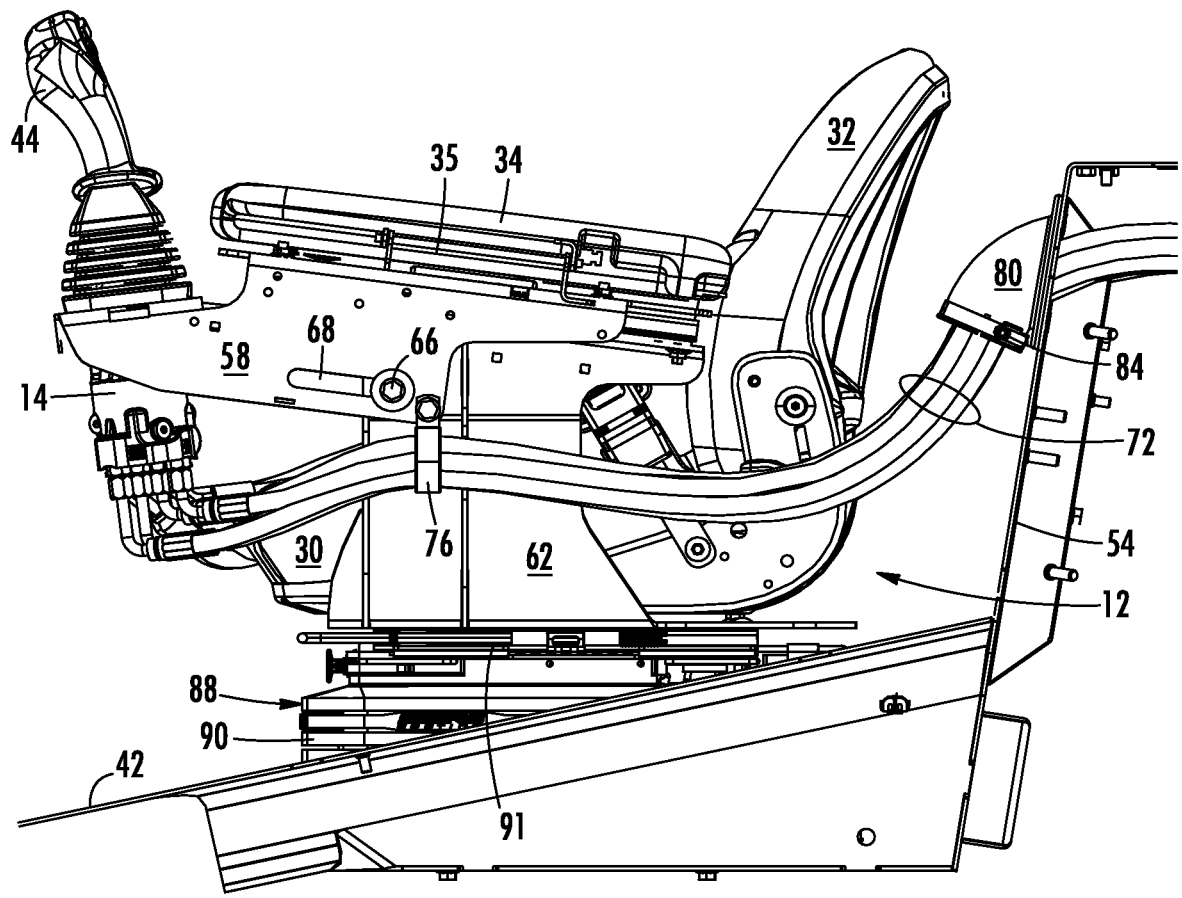
FIG. 12 is generally the same as FIG. 8 with the exception that the control valve and arm rest are located at the forward-most position relative to the seat back, the seat assembly is located in its forward-most position relative to the rear wall of the cab, and the seat assembly is positioned in its highest position relative to the cab floor.

In one embodiment, arm rests 34, 36 are integrally formed with respective operator restraints 38, 40 and pivotally attached by pivot assemblies 35 to respective frames 58 and 60 to pivot between an operator restrained position (see e.g. FIGS. 1-6, 8-12 and 14) and an un-restrained position (see e.g. FIG. 7). Frames 58 and 60 are slidably/adjustably attached to seat assembly 12 frame 62 by slides 64 (see FIG. 8 which includes a broken away view) and slide limit pins/bolts 66 which slide within slots 68.

Each valve 14, 16 is attached to a respective set 72, 74 of six (6) hydraulic hoses which including a supply hose, a return hose, a first pair of hoses for one control function and a second pair of hoses for a second control function. By way of example the first pair of hoses for valve 14 may be for forward and reverse control of tracks 28 and the second pair of hoses for control of the relative speed of tracks 28 to permit turning of loader 10. Similarly, the first pair of hoses for valve 16 may be used to control the motion of the hydraulic cylinders which are coupled to the lift arms 25 to move lift assembly 22 to raise and lower bucket 23 while the second pair of hoses control the rotation of bucket 23 along path R-R (see FIG. 1).

One of the design challenges with supporting valves 14 and 16 to move with seat assembly 12 and also allow valves 14 and 16 to be adjusted relative to seat assembly 12 is to protect hose sets 72 and 74 from damage due to flexing and movement relative to cab 18. In particular, it is important to protect the hose sets 72 and 74 from movement relative to the openings in rear cab wall 54 through which the sets 72 and 74 pass for connection to the respective hydraulic systems (discussed in further detail below). To provide this protection, hose sets 72, 74 are supported by hose supports 76, 78 attached to frames 58, 60. Hose sets 72, 74 are also supported and guided through rear cab wall 54 by respective curved rubber guide boots 80, 82. Boots 80 and 82 prevent hose sets 72 and 74 from directly contacting wall 54, and cause the portions of the hose sets 72, 74 to be held in a curved shape at the point which they pass through wall 54. Boots 80, 82 are attached at one end to the perimeter of a respective passage hole in wall 54 and clamped to a respective hose set 72, 74 at the opposite end with a respective clamp 84, 86.

Referring to the motion of seat assembly 12, seat assembly 12 is supported by a seat support 88 which permits motion of the seat assembly 12 in at least two directions and which resiliently suspends the seat 30 in a vertical seat location relative to cab floor 42. To provide for the selection of a vertical seat location, the support 88 includes a standard scissors linkage biased to a selected vertical seat location by an adjustable spring assembly or air bag. The spring assembly permits the seat 30 to float relative to the selected location. To dampen seat movement or float, a dampening device or devises may be used coupled to the linkage and/or spring to provide a dampened resilient support of seat assembly 12. The linkage, spring assembly and dampener are not specifically shown because they are housed within a rubber, protective dust boot 90.

Seat support 88 also includes a slide mechanism 91 which attaches seat 30 to support 88 to permit movement of seat assembly 12 along a longitudinal axis generally parallel to the longitudinal axis of loader 10. This permits the operator to move and latch the seat assembly 12 into a longitudinal position satisfactory to the operator. As can be appreciated, by integrating control valves 14, 16 with seat assembly 12, these valves retain their relative positions relative to the operator after the seat 30 is positioned vertically or longitudinally and while the seat 30 is resiliently moving relative to loader 10.

Figure 13:
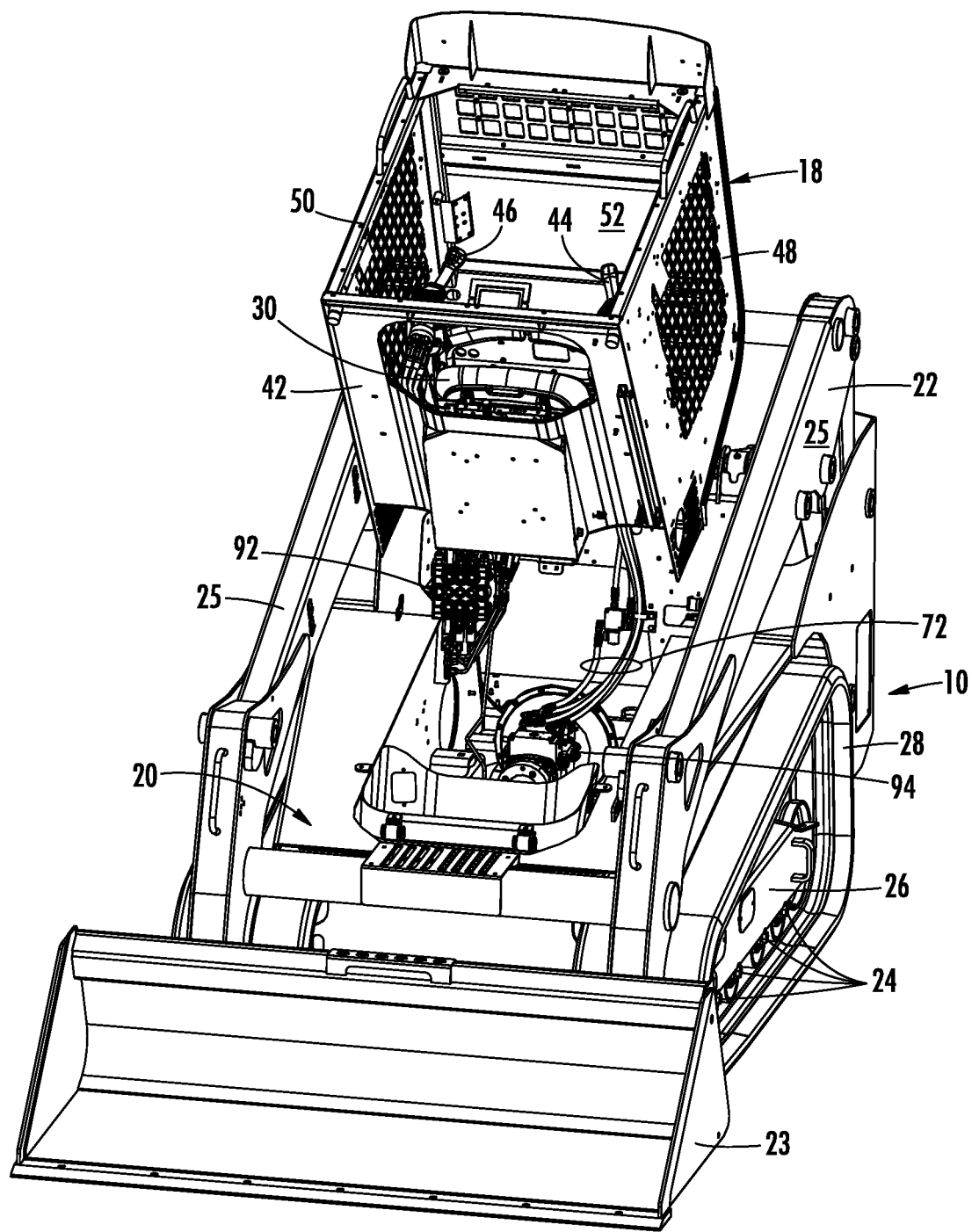
FIG. 13 is a right perspective view of the loader with the cab pivoted into its upward position to permit access to the loader hydraulics.
Figure 14:
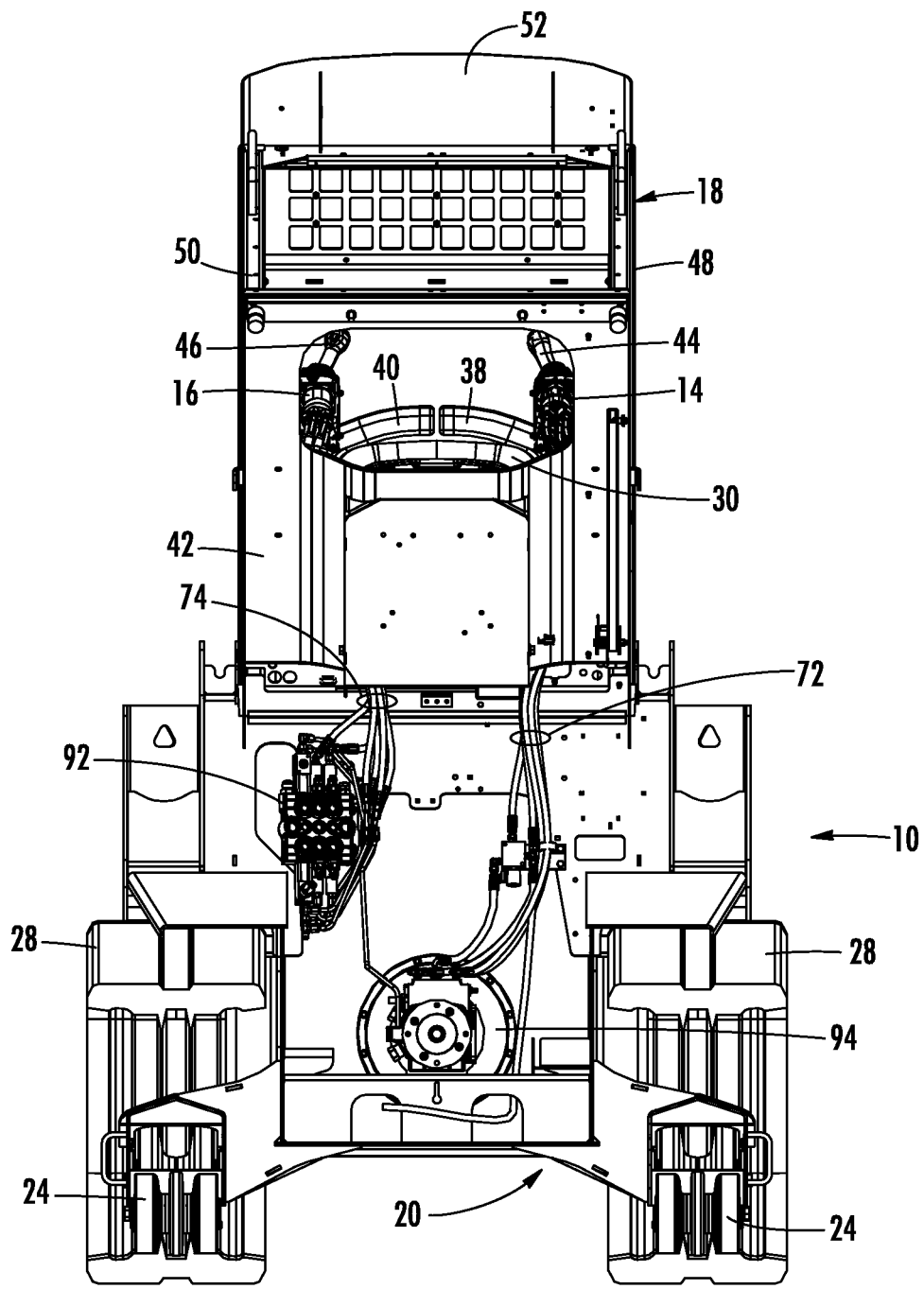
FIG. 14 is a front sectional view of the loader with the cab pivoted into its upward position to permit access to the loader hydraulics.

Referring now to FIGS. 13 and 14, cab 18 of loader 10 is shown pivoted about a rear pivot to a position which permits access to, and viewing of, the implement valve assembly 92 and variable displacement drive pumps 94. As shown in FIG. 14, hose set 72 is coupled to drive pumps 94 to permit right pilot valve 14 to control pumps 94 which supply hydraulic fluid to right and left hydraulic drive motors (not shown) of loader 10. Each drive motor drives a respective drive wheel for moving a respective track 28. With this arrangement the loader operator can use valve 14 to control the forward and reverse motion and turning of loader 10. Hose set 74 is coupled to valve assembly 92 to permit left pilot valve 16 to control valve assembly 92 which controls the supply of hydraulic fluid from a hydraulic implement pump (not shown) to a hydraulic implement such as lift assembly 22. In the present embodiment of loader 10, assembly 92 supplies hydraulic fluid to the lift and rotation hydraulic cylinders of lift assembly 22. With this arrangement the loader operator can raise and lower, and rotate bucket 23.

In various exemplary embodiments, the relative dimensions, including angles, lengths and radii, as shown in the Figures are to scale. Actual measurements of the Figures will disclose relative dimensions and angles of the various exemplary embodiments. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A loader comprising:
   a chassis;

a lift assembly supported by the chassis and motivated by at least first and second hydraulic cylinders;

a hydraulic pump coupled to the first and second hydraulic cylinders by respective first and second hydraulic valves;

at least two wheels driven by respective first and second hydraulic motors for moving the chassis;

a cab pivotally coupled to the chassis and including a floor and a plurality of cab walls extending from the floor;

a seat assembly including a seat, back rest, first and second arm rests, and a base attached to the floor to resiliently move perpendicular to the floor, and be selectively moveable parallel to the floor;

first and second variable displacement pumps coupled respectively to the first and second hydraulic motors;

a first operator-actuated hydraulic pilot valve coupled to the first and second hydraulic valves to control a flow of hydraulic fluid to the first and second hydraulic cylinders, the first operator-actuated hydraulic pilot valve being attached to the seat proximate to the first arm rest;

a second operator-actuated hydraulic pilot valve coupled to the first and second pumps to control the first and second hydraulic motors, the second operator-actuated hydraulic pilot valve being attached to the seat proximate to the second arm rest;

a first plurality of hydraulic hoses extending through an opening in one of the cab walls and attaching the first operator-actuated hydraulic pilot valve to the first and second hydraulic valves; and a second plurality of hydraulic hoses extending through the opening in one of the cab walls and attaching the second operator-actuated hydraulic pilot valve to the first and second hydraulic motors, wherein when the seat moves relative to the cab, the operator-actuated hydraulic pilot valves move with the seat relative to the cab, and a curved boot is attached at the circumference of the opening such that the hydraulic hoses pass through the curved boot and at least a portion of the hydraulic hoses are maintained in a curved path between the pilot valves and respective valves and pumps to reduce wear to the hydraulic hoses relative to the cab during relative movement of the cab, seat, and chassis.

2. The loader of claim 1, wherein the first and second plurality of hydraulic hoses pass through the opening in a cab wall.

3. The loader of claim 1, further comprising a first operator handle connected directly to the first operator-actuated hydraulic pilot valve and a second operator handle connected directly to the second operator-actuated hydraulic pilot valve.

4. The loader of claim 1, wherein the loader includes a pair of tracks each being independently driven by a respective one of the two wheels.

5. The loader of claim 1, further comprising a second set of wheels wherein one of the second set of wheels is driven in synchronism with a respective one of the two wheels.

6. The loader of claim 1, wherein the lift assembly includes at least one lift arm and a bucket rotatable relative to the at least one lift arm by one of the first or second cylinders.

7. The loader of claim 1, wherein at least one of the pilot valves is attached to the seat with an adjustment frame which permits adjusting the location of the pilot valve relative to the seat back to accommodate different sized operators.

8. The loader of claim 1, further comprising first and second pivoting operator restraints each being pivotably attached to a respective armrest, the restraints pivoting to a first position to permit an operator to move into and out of the seat and pivoting to a second position to restrain the operator in the seat during loader operation.

9. A hydraulic control system for use by the operator of a loader, the system comprising:

a hydraulic pump coupled to first and second hydraulic cylinders by respective first and second hydraulic valves;

first and second hydraulic motors for rotating respective first and second wheels;

a seat assembly including a seat, a back rest, first and second arm rests, and a base attached to a floor of an operator cab to resiliently move perpendicular to the floor, and be selectively moveable parallel to the floor;

first and second variable displacement pumps coupled respectively to the first and second hydraulic motors;

a first operator-actuated hydraulic pilot valve coupled to the first and second hydraulic valves to control a flow of hydraulic fluid to the first and second hydraulic cylinders, the first operator-actuated hydraulic pilot valve being attached to the seat proximate to the first arm rest;

a second operator-actuated hydraulic pilot valve coupled to the first and second pumps to control the first and second hydraulic motors, the second operator-actuated hydraulic pilot valve being attached to the seat proximate to the second arm rest;

a first plurality of hydraulic hoses attaching the first operator-actuated hydraulic pilot valve to the first and second hydraulic valves;

a second plurality of hydraulic hoses attaching the second operator-actuated hydraulic pilot valve to the first and second hydraulic motors, wherein when the seat moves relative to the cab, the operator-actuated hydraulic pilot valves move with the seat relative to the cab; and a hollow and curved boot through which the hydraulic hoses pass and wherein a portion of the hydraulic hoses are maintained in a curved path by the boot.

10. The system of claim 9, further comprising a first operator handle connected directly to the first operator-actuated hydraulic pilot valve and a second operator handle connected directly to the second operator-actuated hydraulic pilot valve.

11. The system of claim 10, wherein the seat comprises at least one pivoting operator restraint which pivots to permit an operator to move into and out of the seat and pivot the restraint to hold the operator in the seat during loader operation.

12. The loader of claim 10, wherein the loader includes a pair of tracks each being independently driven by a respective one of the first or second wheels.

13. The loader of claim 10, further comprising a second set of wheels wherein one of the second set of wheels is driven in synchronism with a respective one of the first or second wheels.

14. The loader of claim 9, wherein at least one of the pilot valves is attached to the seat with an adjustment frame which permits adjusting the location of the pilot valve relative to the seat back to accommodate different sized operators.

15. The loader of claim 9, further comprising first and second pivoting operator restraints each being attached to a respective armrest, the restraints pivoting to a first position to permit an operator to move into and out of the seat and pivoting to a second position to restrain the operator in the seat during loader operation.

16. A loader comprising:
   a chassis;
   a task handling means supported by the chassis and motivated by at least first and second hydraulic cylinders;
   a hydraulic pump coupled to the first and second hydraulic cylinders by respective first and second hydraulic valves;
   at least two wheels driven by respective first and second hydraulic motors for moving the chassis;
   a cab pivotally coupled to the chassis and including a floor and a plurality of cab walls extending from the floor;
   a seat assembly including a seat, a back rest, first and second arm rests, and a base attached to the floor to resiliently move perpendicular to the floor, and be selectively moveable parallel to the floor;
   first and second variable displacement pumps coupled respectively to the first and second hydraulic motors;
   first operator-actuated means for controlling a flow of hydraulic fluid to the first and second hydraulic cylinders, the first operator-actuated means being attached to the seat assembly proximate to the first arm rest;
   second operator-actuated means for controlling the first and second variable displacement pumps, the second operator-actuated means being attached to the seat assembly proximate to the second arm rest;
   a first plurality of hydraulic hoses extending through one of the cab walls and attaching the first operator-actuated means to the first and second hydraulic valves;
   a second plurality of hydraulic hoses extending through one of the cab walls and attaching the second operator-actuated means to the first and second hydraulic motors, wherein when the seat moves relative to the cab, the first and second operator-actuated means move with the seat relative to the cab,
   a first curved boot through which the first plurality of hydraulic hoses pass and wherein a portion of the first plurality of hydraulic hoses are maintained in a curved path by the first boot; and
   a second curved boot through which the second plurality of hydraulic hoses pass and wherein a portion of the second plurality of hydraulic hoses are maintained in a curved path by the second boot.

17. The loader of claim 16, wherein the first and second operator-actuated means are hydraulic control valves.

18. The loader of claim 17, wherein at least one of the hydraulic control valves is attached to the seat with an adjustment frame which permits adjusting the location of a pilot valve relative to the seat back to accommodate different sized operators.

* * * * *